United States Patent
Mizunuma et al.

(10) Patent No.: US 10,800,078 B2
(45) Date of Patent: Oct. 13, 2020

(54) TERMINAL INSERT ARTICLE

(71) Applicant: DENSO CORPORATION, Kariya, Aichi-pref. (JP)

(72) Inventors: Takehito Mizunuma, Kariya (JP); Takamitsu Kubota, Kariya (JP); Yoshiyuki Kono, Kariya (JP); Haruhiko Suzuki, Kariya (JP)

(73) Assignee: DENSO CORPORATION, Kariya (JP)

(*) Notice: Subject to any disclaimer, the term of this patent is extended or adjusted under 35 U.S.C. 154(b) by 304 days.

(21) Appl. No.: 15/749,188

(22) PCT Filed: Aug. 8, 2016

(86) PCT No.: PCT/JP2016/073231
§ 371 (c)(1),
(2) Date: Jan. 31, 2018

(87) PCT Pub. No.: WO2017/033714
PCT Pub. Date: Mar. 2, 2017

(65) Prior Publication Data
US 2018/0222096 A1    Aug. 9, 2018

(30) Foreign Application Priority Data

Aug. 21, 2015    (JP) .................................. 2015-163887
Jun. 23, 2016    (JP) .................................. 2016-124403

(51) Int. Cl.
*B29C 45/14*    (2006.01)
*H02K 15/12*    (2006.01)
(Continued)

(52) U.S. Cl.
CPC .... *B29C 45/14065* (2013.01); *B29C 45/0025* (2013.01); *B29C 45/0046* (2013.01);
(Continued)

(58) Field of Classification Search
CPC .......... B29C 45/14065; B29C 45/0025; B29C 45/0046; B29C 45/14; B29C 45/14539; B29C 2045/1486
(Continued)

(56) References Cited

U.S. PATENT DOCUMENTS 4,796,354 A    1/1989    Yokoyama et al.
8,635,986 B2    1/2014    Ikeda et al.
(Continued)

FOREIGN PATENT DOCUMENTS

CN    203543013    4/2014
JP    H04-332156    11/1992
(Continued)

*Primary Examiner* — Christina A Johnson
*Assistant Examiner* — Xue H Liu
(74) *Attorney, Agent, or Firm* — Nixon & Vanderhye P.C.

(57) ABSTRACT

A terminal insert article includes a metal terminal, and a resin molded article in which the terminal is inserted. The molded article is formed by injection molding. When a position of the molded article into which molten resin is injected at time of the injection molding is referred to as a resin injection position, the resin injection position is formed in a projecting shape. The molded article includes a spherical surface part at an opposite position from the resin injection position. The spherical surface part has a spherical surface shape swollen out in a direction away from the resin injection position. A component that constitutes a rotation angle sensor, which detects a rotation angle of a rotatably-supported shaft, is inserted in the molded article.

5 Claims, 5 Drawing Sheets

(51) Int. Cl.
  *G01D 5/14* (2006.01)
  *G01D 11/24* (2006.01)
  *G01D 5/12* (2006.01)
  *B29C 45/00* (2006.01)

(52) U.S. Cl.
  CPC ........ *B29C 45/14* (2013.01); *B29C 45/14639* (2013.01); *G01D 5/12* (2013.01); *G01D 5/14* (2013.01); *G01D 5/145* (2013.01); *G01D 11/245* (2013.01); *H02K 15/12* (2013.01); *B29C 2045/1486* (2013.01)

(58) Field of Classification Search
  USPC ........................................................ 264/275
  See application file for complete search history.

(56) References Cited

U.S. PATENT DOCUMENTS

| | | |
|---|---|---|
| 2009/0090807 A1 | 4/2009 | Nomura et al. |
| 2011/0127693 A1 | 6/2011 | Shimoto et al. |
| 2012/0280424 A1 | 11/2012 | Nomura et al. |
| 2012/0286085 A1 | 11/2012 | Nomura et al. |
| 2015/0061657 A1 | 3/2015 | Takiguchi et al. |

FOREIGN PATENT DOCUMENTS

| | | |
|---|---|---|
| JP | H06-177191 | 6/1994 |
| JP | 2001-026038 | 1/2001 |
| JP | 2008-201048 | 9/2008 |
| JP | 2009-090482 | 4/2009 |
| JP | 2011-106419 | 6/2011 |
| JP | 2015-064331 | 4/2015 |
| WO | 2005/058574 | 6/2005 |

TERMINAL INSERT ARTICLE

CROSS REFERENCE TO RELATED APPLICATIONS

This application is the U.S. national phase of International Application No. PCT/JP2016/073231 filed Aug. 8, 2016 which designated the U.S. and claims priority to Japanese Patent Application No. 2015-163887 filed on Aug. 21, 2015 and Japanese Patent Application No. 2016-124403 filed on Jun. 23, 2016, the entire contents of each of which are incorporated herein by reference.

TECHNICAL FIELD

The present disclosure relates to a terminal insert article, in which a terminal is inserted in a molded article formed from resin.

BACKGROUND ART

The art disclosed in Patent Document 1 is known as a terminal insert article, in which a terminal is inserted in a molded article. As an example of the terminal insert article, this Patent Document 1 discloses a sensor cover, in which the terminal electrically connected to a rotational angle sensor is inserted in the molded article.

PRIOR ART DOCUMENT

Patent Document

Patent Document 1: JP2008-201048A

In the case of a molding die used at the time of injection molding of a molded article, the port through which resin is injected into the molding die is hereinafter referred to as a gate part. The position of the molded article after molding that receives the injection of resin from the gate part is referred to as a resin injection position. In addition, tearing the resin cured at the gate part off the molded article is referred to as a gate cut.

A first issue will be described. At the time of injection molding of a molded article, high-temperature molten resin comes into contact with the inserted terminal so that the terminal stores heat. If the terminal is located near the gate part, the resin injection position close to the terminal is not sufficiently cured due to the heat stored by the terminal. If the gate cut is carried out in this state, the resin cured in the gate part disorderly breaks the insufficiently-cured resin injection position. The resin injection position being broken creates a low-strength part at the resin injection position due to a recess or the like.

A second issue will be described. When a cold heat stress is received, a crack easily develops at the resin injection position of the molded article that is formed from resin containing reinforced fiber. This defect will be described specifically. The linear thermal expansion coefficient of the reinforced fiber with an orientation along one direction, and the linear thermal expansion coefficient of the reinforced fiber with an orientation perpendicular to one direction are different. Thus, the linear thermal expansion coefficient of the resin incorporating the reinforced fiber varies according to the difference in orientation of the reinforced fiber. Generally, when injection molding is performed, the reinforced fiber is oriented along the flow direction of resin on the surface layer near the resin injection position α, whereas the reinforced fiber is oriented in the direction perpendicular to the flow direction of resin inside near the resin injection position α. For this reason, the linear thermal expansion coefficient on the surface layer and inside near the resin injection position are greatly different. Consequently, when the molded article receives the cold heat stress, the difference of the linear thermal expansion coefficient between the surface layer and inside easily develops a crack at the resin injection position.

SUMMARY OF INVENTION

It is an objective of the present disclosure to provide a terminal insert article that can prevent a low-strength portion from being produced at a resin injection position and that can prevent a crack at the resin injection position from being produced when a cold heat stress is received.

To achieve the objective, the resin injection position in an aspect of the present disclosure formed in a projecting shape can increase the distance from a gate part to a terminal at the time of molding. Consequently, even though molten resin comes into contact with the terminal at the time of molding so that the terminal stores heat, the heat stored by the terminal can be restricted from having an influence on the resin injection position. Thus, when the gate cut is carried out, the temperature of the resin injection position can be decreased to avoid the insufficient cure of the resin injection position. As a result, there can be averted such a failure as the resin cured in the gate part breaking the insufficiently-cured resin injection position when the gate cut is performed, and a low-strength portion created by the resin injection position being broken can be prevent from being formed at the resin injection position.

Because the resin injection position is formed in a projecting shape, the resin, which is formed into the resin injection position, is greater in amount than the conventional art. Thus, the resin of the resin injection part increased in amount disperses and absorbs a deformation caused at the resin injection part when the cold heat stress is received This can reduce the stress generated at the resin injection position to prevent a crack at the resin injection position from being produced.

BRIEF DESCRIPTION OF DRAWINGS

The above and other objects, features and advantages of the present disclosure will become more apparent from the following detailed description made with reference to the accompanying drawings. In the drawings.

EMBODIMENT FOR CARRYING OUT INVENTION

An embodiment will be described below with reference to the accompanying drawings. The embodiment described below discloses an example, and needless to say, the present disclosure is not limited to the embodiment.

The embodiment will be described with reference to FIGS. 1 to 7. A vehicle includes a throttle valve 1 that regulates the amount of intake air supplied to an engine.

Figure 1:
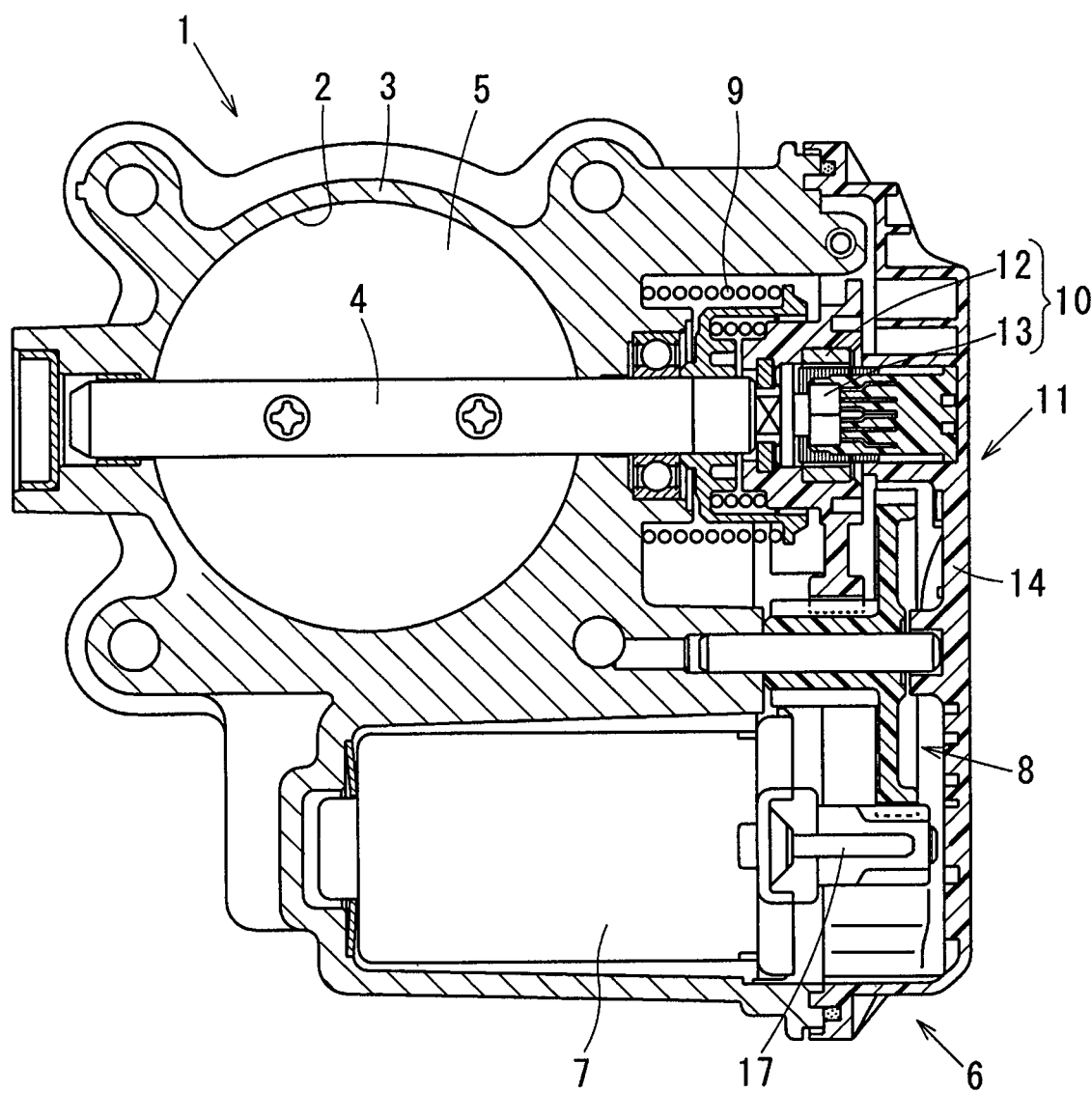
FIG. 1 is a sectional view illustrating a throttle valve in accordance with an embodiment.
Figure 2:
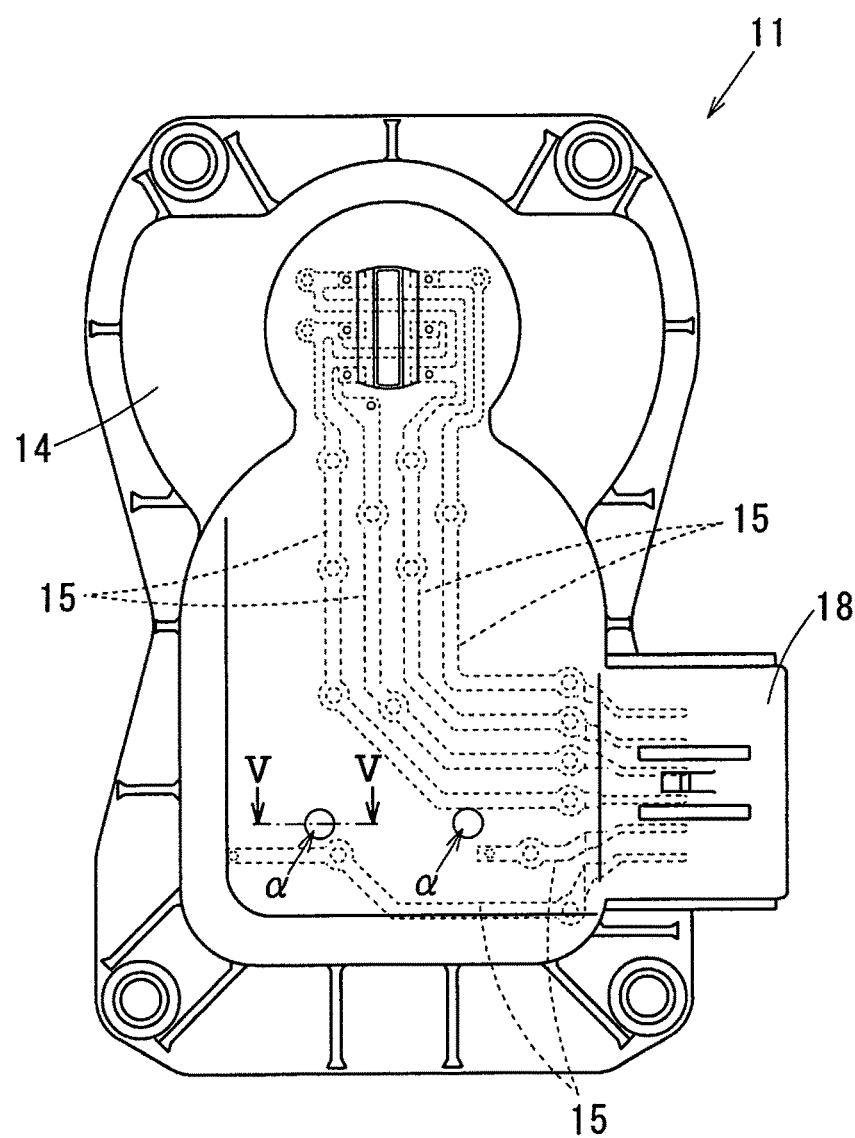
FIG. 2 is a diagram illustrating an outer surface of a sensor cover viewed from outside according to the embodiment.

The basic structure of the throttle valve 1 is widely known and its specific one example is illustrated in FIG. 1. The throttle valve 1 includes a housing 3 that includes a part of an intake passage 2, a shaft 4 that is supported rotatably relative to this housing 3, and a butterfly valve element 5 that is fixed to the shaft 4 in the intake passage 2.

The throttle valve 1 includes an electric actuator 6 that drives the shaft 4. The electric actuator 6 is a widely known actuator that generates a rotation output, and includes an electric motor 7 that generates rotation force upon energization, a deceleration mechanism 8 that amplifies this rotation output of the electric motor 7 to drive the shaft 4, and a spring 9 that returns the shaft 4 to its initial position. The electric actuator 6 includes a rotation angle sensor 10 that detects a rotation angle of the shaft 4.

The electric actuator 6 is attached to the housing 3, and a sensor cover 11 assembled by screws or the like is attached to the housing 3. The electric motor 7 is accommodated in a motor accommodation chamber, which is formed in the housing 3, and the deceleration mechanism 8, the spring 9, and so forth, are accommodated in the space formed between the housing 3 and the sensor cover 11.

The rotation angle sensor 10 is a throttle position sensor that detects the rotation angle of the shaft 4 to detect an opening degree of the valve element 5, and outputs an opening degree signal in accordance with the rotation angle of the shaft 4 to an engine control unit. The rotation angle sensor 10 is a magnetic type sensor that detects a relative rotation between two members without contact, and includes a magnetic circuit part 12 that rotates integrally with the shaft 4, and a magnetism detection part 13 that is provided for the sensor cover 11 to be disposed without contact with the magnetic circuit part 12. This magnetism detection part 13 is a primary molded article that is obtained by inserting by thermoset resin a Hall IC that generates a voltage output in accordance with the detected magnetic flux, a capacitor that removes noise, for example, sensor terminals, and so forth.

The sensor cover 11 corresponds to a terminal insert article, and includes a metal terminal 15, and a molded article 14 made of resin in which this terminal 15 is inserted. This sensor cover 11 is a secondary molded article that is obtained by inserting a part of the magnetism detection part 13 and the terminals 15. Thus, the magnetism detection part 13 is inserted in the molded article 14, which serves as a part constituting the rotation angle sensor 10. The sensor terminals provided for the magnetism detection part 13 are electrically and mechanically joined, for example, by welding, to the terminals 15 that are inserted in the molded article 14.

Two motor contacts 16 for energizing the electric motor 7 are inserted in the molded article 14. This motor contact 16 is electrically connected to a motor terminal 17, which is provided at the electric motor 7 by attaching the sensor cover 11 to the housing 3. The two motor contacts 16 are electrically and mechanically joined, for example, by welding, to the two terminals 15 inserted in the molded article 14.

The above-described terminals 15 are provided by cutting a thin conductive metal plate into a predetermined shape, for example, by press work. One ends of the terminals 15 are arranged to be exposed to the inside of a connector 18, which is provided by the molded article 14.

The molded article 14 is formed into a predetermined shape by injection molding. As a means for enhancing the strength of the molded article 14, reinforced fiber is contained in the resin, which is formed into the molded article 14. A specific example of the reinforced fiber is not limited, but glass fiber is used as one example for the reinforced fiber. The injection molding is to inject molten high-temperature resin into a molding die A and to remove the molded article 14 from the molding die A after the resin is cured. The molding die A includes a gate part X through which the molten molded article 14 is injected into the molding die A. The molding die A is a widely known die, and the molding die A is cooled, for example, by water cooling or oil cooling, as a means for curing the injected high-temperature resin in a short time.

The position of the molded article 14 removed from the molding die A, where the gate part X opens, is referred to as a resin injection position α. In other words, the position of the molded article 14 into which the molten resin is injected from the gate part X is called a resin injection position α. On the resin injection position α, the trace of the resin cured in the gate part X is referred to as a gate trace β. This gate trace β may be removed, for example, by cutting technology or polishing technique, after molding, but FIG. 5 illustrates the molded article 14 including the gate trace β left thereon.

Figure 3:
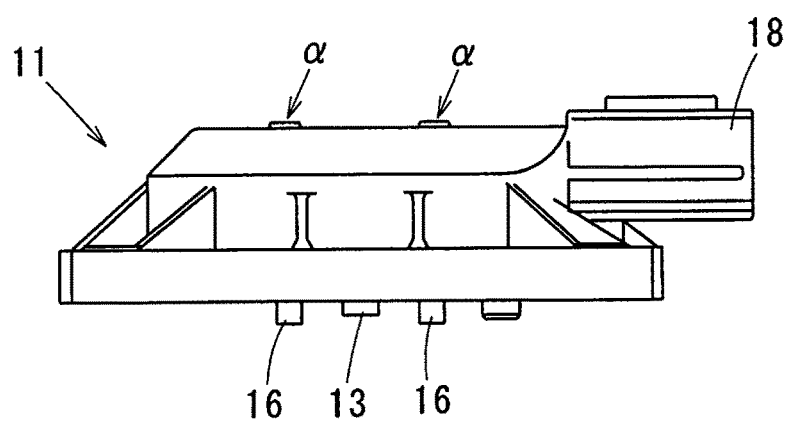
FIG. 3 is a side view illustrating the sensor cover of the embodiment.
Figure 4:
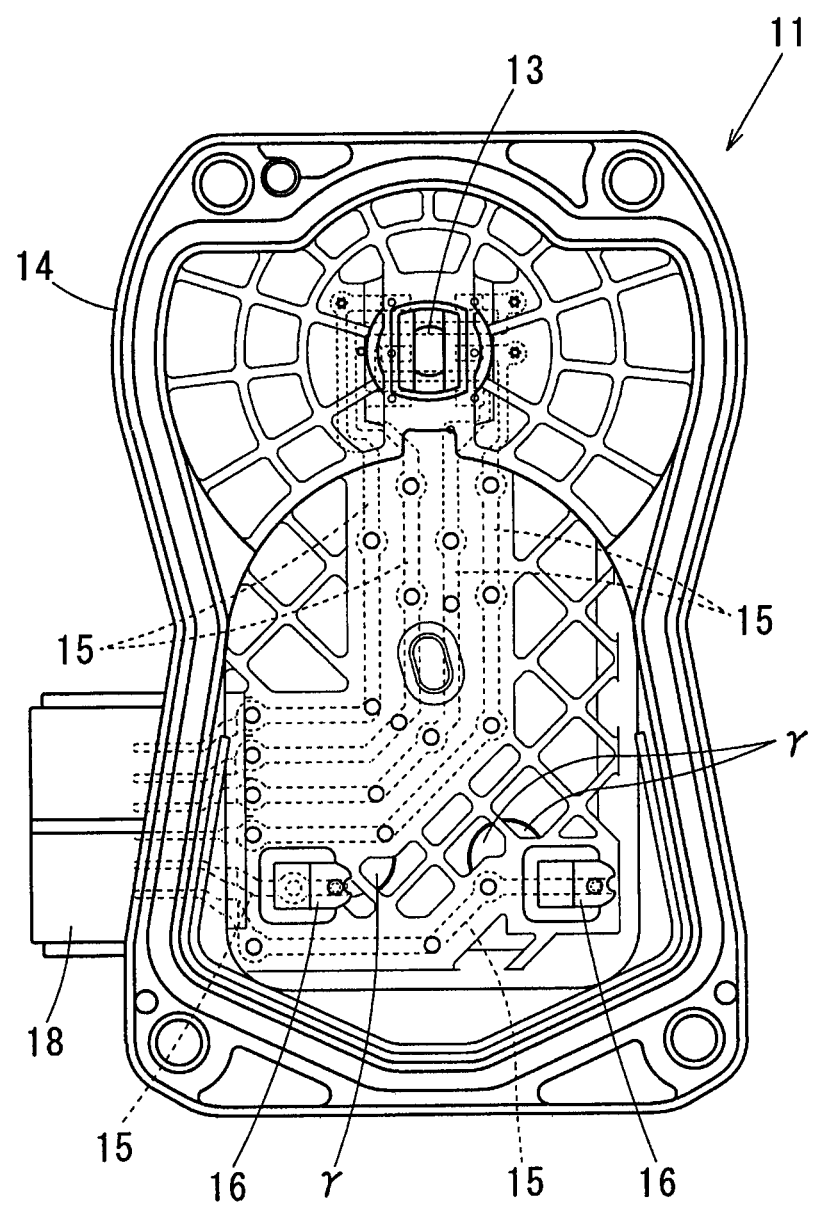
FIG. 4 is a diagram illustrating an inner surface of the sensor cover viewed from inside according to the embodiment.
Figure 5:
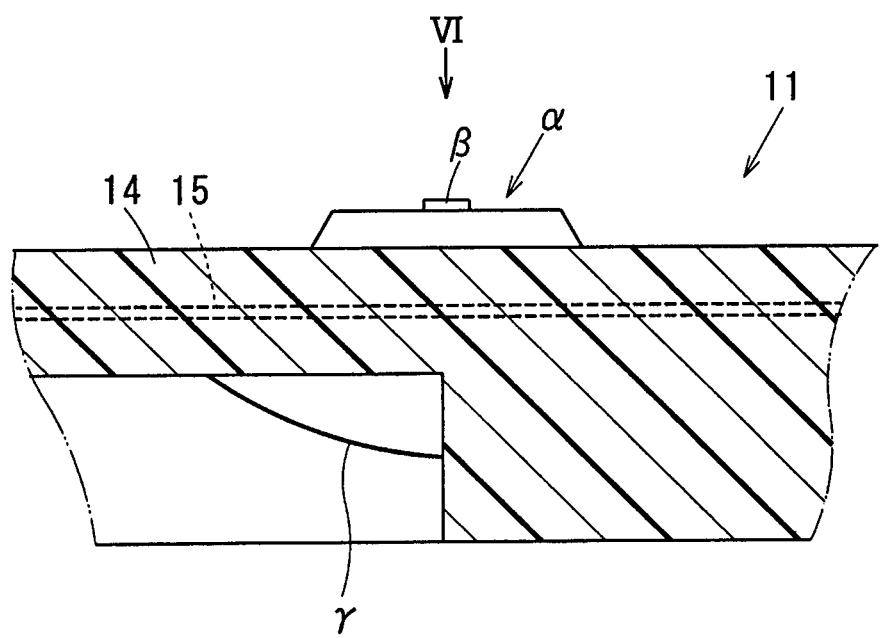
FIG. 5 is a sectional view taken along a line V-V in FIG. 2.
Figure 6A:
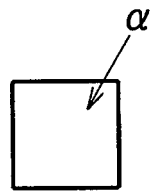
FIG. 6A is a diagram viewed from VI in FIG. 5 illustrating a projecting shape of a resin injection position having a quadrangular prism shape.
Figure 6B:
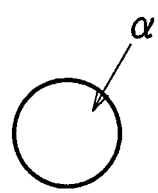
FIG. 6B is a diagram viewed from VI in FIG. 5 illustrating a projecting shape of a resin injection position having a circular cylinder shape.
Figure 6C:
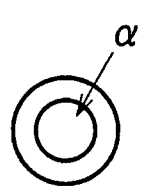
FIG. 6C is a diagram viewed from VI in FIG. 5 illustrating a projecting shape of a resin injection position having a conical trapezoid shape.
Figure 7:
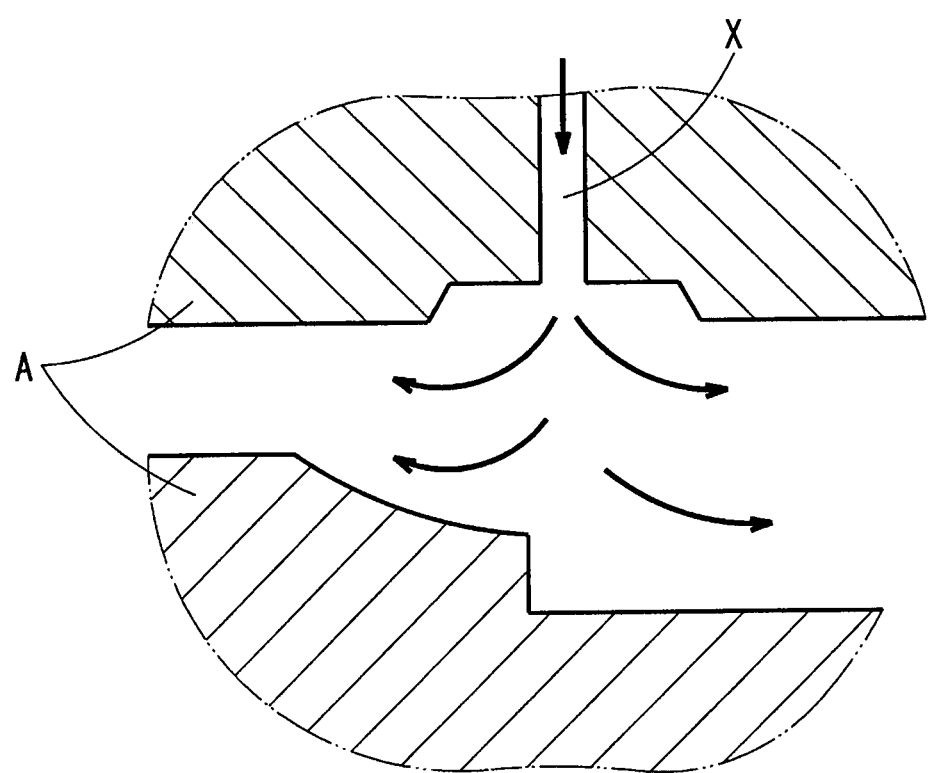
FIG. 7 is a sectional view illustrating a main part of a molding die of the embodiment.

The resin injection position α has a projecting shape as illustrated in FIGS. 3 and 5. This resin injection position α has a shape projecting from the surface of the molded article 14 around the resin injection position α. The gate trace β described above is located generally at the center of the top part of the resin injection position α. The projecting shape of the resin injection position α is not limited, and is provided as, for example, the shape of a quadrangular prism, a circular cylinder, or a conical trapezoid as illustrated in FIGS. 6A to 6C. FIGS. 6A to 6C illustrate the resin injection position α with the gate trace β (see FIG. 5) removed by cutting technology or polishing technique, for example.

The molded article 14 includes a spherical surface part γ at the position opposite from the resin injection position α. This spherical surface part γ has a spherical surface shape swollen out in a direction away from the resin injection position α. The positional relationship between the projecting shape of the resin injection position α and the spherical surface shape of the spherical surface part γ is concentrically set.

The first effect of the embodiment will be described. When the terminal 15 is located near the resin injection position α, such as directly under the resin injection position α, forming the resin injection position α in a projecting shape as illustrated in this embodiment can increase the distance from the gate part X to the closest terminal 15. Consequently, even though high-temperature molten resin comes into contact with the terminal 15 at the time of molding so that the terminal 15 stores heat, the heat stored by the terminal 15 can be restricted from having an influence on the resin injection position α. Thus, when the gate cut is carried out, the temperature of the resin injection position α can be decreased to avoid the insufficient cure of the resin injection position α. As a result, there can be averted such a failure as the resin cured in the gate part X breaking the insufficiently-cured resin injection position α when the gate cut is performed, and a low-strength portion created by the resin injection position α being broken can be prevent from being formed at the resin injection position α.

The second effect will be described. The resin injection position α of this embodiment is formed in a projecting shape as described above. Thus, the resin, which is formed into the resin injection position α, is greater in amount than the conventional art. Consequently, the resin of the resin injection part α increased in amount disperses and absorbs the deformation caused at the resin injection part α when the resin is cooled at the time of molding. As a result, the stress generated at the resin injection position α when the molded article 14 receives cold heat stress can be reduced, to prevent a crack at the resin injection position α from being produced.

The third effect will be described. The spherical surface part γ of this embodiment is provided on the surface opposite from the resin injection position α. This spherical surface part γ disturbs the flow of resin near the gate part X to make random the orientation of the reinforced fiber near the gate part X. This can reduce the difference of the linear thermal expansion between the surface layer and inside near the resin injection position α. As a result, the stress generated at the resin injection position α when the molded article 14 receives cold heat stress can be reduced, to prevent a crack at the resin injection position α from being produced. If the thickness of the position different from the resin injection part α is also increased, the issue of a vacant hole formed in the thickened resin arises. Thus, this embodiment provides the spherical surface part γ only on the surface opposite from the resin injection position α to minimize the position whose thickness to be increased.

The fourth effect will be described. As described above, the resin injection position α can avert such a failure as the cured resin breaking the resin injection position α at the gate part X, and can avoid such a failure as a crack caused at the resin injection position α. This can improve the quality of the sensor cover 11 thereby to raise the quality of the rotation angle sensor 10 and the electric actuator 6 which are configured to include the sensor cover 11. Consequently, the quality of the throttle valve 1 can be raised.

Modifications to the above embodiment will be described. The above embodiment illustrates that the two resin injection positions α are provided at the sensor cover 11, but the number of resin injection positions α is not limited.

The above embodiment illustrates that the resin injection position α is provided on the front surface of the sensor cover 11, but the resin injection position α may be provided on the rear surface of the sensor cover 11.

The above embodiment illustrates the example of application of the present disclosure to the sensor cover 11 of the electric actuator 6 that drives the throttle valve 1, but the present disclosure is not limited to this example. Specifically, the present disclosure can be applied to various terminal insert articles in which the terminal 15 is inserted in the molded article 14. To disclose an example in order to help understanding, the present disclosure may be applied to the electric actuator 6 that drives an EGR valve. Or, the present disclosure may be applied to the electric actuator 6 that drives an intake port valve such as a tumble flow control valve. Or, the present disclosure may be applied to the electric actuator 6 that drives, for example, the volume regulating valve of a turbocharger.

The above embodiment illustrates the molded article 14 in which the terminal 15 that is electrically connected to the rotation angle sensor 10 is inserted and the terminal 15 that is electrically connected to the electric motor 7 is inserted, but the present disclosure is not limited to this example. Specifically, the present disclosure may be applied to the molded article 14 in which only the terminal 15 electrically connected to the rotation angle sensor 10 is inserted. Or, the present disclosure may be applied to the molded article 14 in which only the terminal 15 electrically connected to the electric motor 7 is inserted.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A terminal insert article comprising:
   a metal terminal; and
   a resin molded article in which the terminal is inserted, wherein:
   the molded article is formed by injection molding; and
   when a position of the molded article into which molten resin, which contains reinforced fiber, is injected at time of the injection molding is referred to as a resin injection position, the resin injection position is formed in a projecting shape;
   the molded article includes a spherical surface part at an opposite position from the resin injection position;
   the spherical surface part has a spherical surface shape swollen out in a direction separating from the resin injection position;
   the resin injection position has a projecting shape projecting from a surface of the molded article;
   the projecting shape of the resin injection position and the spherical surface shape of the spherical surface part are concentric to each other; and
   a gate trace is located at a top part of the resin injection position.

2. The terminal insert article according to claim 1, wherein a component that constitutes a rotation angle sensor, which detects a rotation angle of a rotatably-supported shaft, is inserted in the molded article.

3. The terminal insert article according to claim 1, wherein:
   the gate trace is located at a center of the top part of the resin injection position; and
   the projecting shape of the resin injection position has a quadrangular prism shape, a circular cylinder shape, or a conical trapezoid shape.

4. The terminal insert article according to claim 1, wherein:
   a center of the resin injection position does not overlap with the metal terminal when viewed along a direction in which resin is injected through the resin injection position.

5. The terminal insert article according to claim 1, wherein:
   the molded article includes a thin portion on one side relative to the resin injection position and a thick portion on an other side relative to the resin injection position in a radial direction;

the thin portion is thinner than the thick portion; and the spherical surface part partially has the spherical surface shape and is located on an opposite side of the thin portion across the resin injection position.

* * * * *